(12) United States Patent
Carlitz et al.

(10) Patent No.: US 9,421,844 B2
(45) Date of Patent: Aug. 23, 2016

(54) TORSION BEAM AXLE FOR A VEHICLE, AND BEARING ARRANGEMENT FOR A TORSION BEAM AXLE

(71) Applicant: FORD GLOBAL TECHNOLOGIES, LLC, Dearborn, MI (US)

(72) Inventors: Andreas Carlitz, Stolberg (DE); Eric Leonard Branger, Cologne (DE); Gunter Wuersig, Alsdorf (DE); Thomas Schmitz, Essen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/490,228

(22) Filed: Sep. 18, 2014

(65) Prior Publication Data

US 2015/0076782 A1    Mar. 19, 2015

(30) Foreign Application Priority Data

Sep. 18, 2013  (DE) .......................... 10 2013 218 701

(51) Int. Cl.
*B60G 7/02*     (2006.01)
*B60G 21/05*    (2006.01)
*F16C 27/06*    (2006.01)

(52) U.S. Cl.
CPC ............ *B60G 21/052* (2013.01); *B60G 21/051* (2013.01); *B60G 21/053* (2013.01);
(Continued)

(58) Field of Classification Search
CPC ................... B60G 21/052; B60G 7/02; B60G 2204/4302; B60G 2204/43; B60G 2204/1434; B60G 21/053; B60G 21/051; B60G 2200/20; F16C 27/063
See application file for complete search history.

(56) References Cited

U.S. PATENT DOCUMENTS

| 3,817,550 A | * | 6/1974 | Young | .................... | B60G 5/03 |
| | | | | | 280/680 |
| 5,337,997 A | * | 8/1994 | Hockney | .................. | B60G 7/02 |
| | | | | | 248/596 |

(Continued)

FOREIGN PATENT DOCUMENTS

DE    27 48 193 A1    5/1979
DE    43 22 910 A1    2/1994
(Continued)

OTHER PUBLICATIONS

Examination Report dated Jun. 5, 2014, issued in corresponding German Application No. 10 2013 218 701.7.

*Primary Examiner* — Paul N Dickson
*Assistant Examiner* — Timothy Wilhelm
(74) *Attorney, Agent, or Firm* — Jones Robb, PLLC; Raymond L. Coppiellie

(57) ABSTRACT

The present disclosure provides a torsion beam axle for a vehicle. The torsion beam axle comprises two longitudinal swing arms connected by a torsion profile and two bearing arrangements. Each bearing arrangement is configured to attach a respective longitudinal swing arm to a body of the vehicle. Each bearing arrangement has a rotational axis, and the rotational axes of the bearing arrangements run in parallel to or are aligned with one another. Each of the bearing arrangements has a bearing core, which is connected to one of the longitudinal swing arms, and at least one bearing arm which is coupled to the bearing core. The bearing arm comprises a supporting section, which is coupled to the bearing core, and an elastic bending section with a connecting region, via which the bearing arm can be at least indirectly attached to the body of the vehicle. The bearing arm has a step portion arranged between the supporting section and the bending section, the step portion having a triangular or trapezoidal contour and being configured to be deflected in a bending direction which is predefined by the bending section. The bending direction and the rotational axes enclose an angle between them.

16 Claims, 2 Drawing Sheets

(52) U.S. Cl.
CPC ........... *F16C27/063* (2013.01); *B60G 2200/20* (2013.01); *B60G 2204/1434* (2013.01); *B60G 2204/43* (2013.01)

(56) References Cited

U.S. PATENT DOCUMENTS

| | | | | |
|---|---|---|---|---|
| 6,022,034 A * | 2/2000 | Santo | ................... | B60G 21/052 280/124.106 |
| 6,135,469 A * | 10/2000 | Hulstein | ................... | B60G 7/02 180/24.02 |
| 6,619,639 B1 * | 9/2003 | Shelley | ................... | B60G 7/008 267/292 |
| 7,252,298 B2 * | 8/2007 | Hughes | ................... | B60G 7/02 267/141 |
| 7,575,243 B2 * | 8/2009 | Takahashi | ................ | B60G 7/02 280/124.11 |
| 7,758,275 B2 * | 7/2010 | Lee | ..................... | B60G 21/052 24/265 B |
| 7,775,535 B2 * | 8/2010 | Bluff | ........................ | B60G 7/02 280/124.116 |
| 8,448,964 B2 * | 5/2013 | Bramer | .................. | B60G 7/001 280/124.1 |
| 8,590,910 B2 * | 11/2013 | Suzuki | .................... | B60G 3/12 180/311 |
| 2015/0123369 A1 * | 5/2015 | Jung | ..................... | B60G 21/052 280/124.128 |

FOREIGN PATENT DOCUMENTS

| | | |
|---|---|---|
| EP | 0 903 251 A1 | 3/1999 |
| FR | 2 520 072 A1 | 7/1983 |
| GB | 2 008 714 A | 6/1979 |
| GB | 2 033 533 A | 5/1980 |
| JP | 07-190132 A | 7/1995 |

* cited by examiner

TORSION BEAM AXLE FOR A VEHICLE, AND BEARING ARRANGEMENT FOR A TORSION BEAM AXLE

CROSS REFERENCE TO RELATED APPLICATIONS

This application claims priority to German Application No. 10 2013 218 701.7, filed on Sep. 18, 2013, the entire content of which is incorporated by reference herein.

TECHNICAL FIELD

The present disclosure relates to a torsion beam axle for a vehicle, in particular, for use as a rear axle for a motor vehicle. The present disclosure further relates to a bearing arrangement for attaching a torsion beam axle to a body of a vehicle.

BACKGROUND

Conventional torsion beam axles usually form a rear axle in the wheel suspension system of a vehicle. In motor vehicles, torsion beam axles are preferably combined with a front wheel drive. Such a conventional torsion beam axle is generally constructed of two longitudinal swing arms, on each of which one wheel of the vehicle axle is rotatably arranged. The longitudinal swing arms are connected to one another in a flexurally rigid manner via a torsion profile, which is oriented transversely with respect to a longitudinal direction of the vehicle. The torsion profile is configured in such a way that it is rotated within itself during compression and rebound of one of the longitudinal swing arms. As a result, the simple structural construction of a vehicle axle is made possible, in which the torsion profile acts as an anti-roll bar.

Suitable bearing arrangements are used to couple the torsion beam axle to the body of the vehicle. The bearing arrangements can contain a rubber/metal bearing in a usual way. The bearings are spaced apart from one another and lie between the longitudinal swing arms and the vehicle body, each forming a structural rotational axis around which the respective longitudinal swing arm can be pivoted.

As a result of the construction of a torsion beam axle of this type, the vehicle exhibits the tendency to oversteer when driving around bends. This is due, in particular, to the course of the rotational axes of the bearings, which predefine the possible movement direction of the longitudinal swing arms with respect to the vehicle. This is the case, in particular, when the individual rotational axes of the two bearing arrangements are aligned with one another. In order for it to be possible to perform a correction to the track of the wheels which changes during compression and rebound, which correction compensates for or at least attenuates the oversteering, corresponding solutions are already known in the prior art. For instance, the respective rotational axis of the bearing arrangements can be inclined, for example, by from 20° to 30° with respect to the vehicle transverse direction. This achieves a situation when driving around bends where the longitudinal swing arm on the outside of the bend is moved forward in the driving direction with respect to the vehicle during its compression. In contrast, the movement of the longitudinal swing arm on the inside of the bend takes place toward the rear.

However, due to the oblique position, the bearing arrangements of the torsion beam axle are then subject to increased wear. In addition, the required deformation of any elastic bodies within the bearing arrangement in combination with their rotation often produces undesired creaking noises.

The measures which are known in the prior art for reducing the oversteering tendency of the torsion beam axle usually require complicated designs. As a result, the space requirement for accommodation is usually increased. In particular, the arrangement of additional intermediate elements and pivot axes can impart an undesired hysteresis to the chassis. Also, the number of components which are subject to wear and the overall weight of axle designs of this type are increased. At the same time, the unsprung masses increase, which can have an undesirable effect on the driving behavior and, in particular, the comfort of the ride. Solutions which propose a special configuration of the rubber/metal bearings can likewise be considered to be complicated to produce and susceptible to wear. In addition, it is questionable to what extent the rubber/metal bearings alone can actually contribute to an improvement in relation to the oversteering tendency of torsion beam axles.

As discussed above, a satisfactory solution for reducing the oversteering tendency of torsion beam axles has not yet been identified. Against this background, the present disclosure is directed to improving a torsion beam axle in relation to its oversteering tendency. The novel design is lightweight, space-saving, simple to produce, and has a long service life, in particular in relation to the wear of the bearings. Furthermore, a bearing arrangement which improves the oversteering tendency for attaching the torsion beam axle to a body of a vehicle also is disclosed. The bearing arrangement is lightweight, makes space-saving and simple production possible and, in particular, has a design with a long service life in relation to the wear of the bearings.

SUMMARY

In accordance with various exemplary embodiments, the present disclosure provides a torsion beam axle for a vehicle. The torsion beam axle comprises two longitudinal swing arms connected by a torsion profile and two bearing arrangements. Each bearing arrangement is configured to attach a respective longitudinal swing arm to a body of the vehicle. Each bearing arrangement has a rotational axis, and the rotational axes of the bearing arrangements run in parallel to or are aligned with one another. Each of the bearing arrangements has a bearing core, which is connected to one of the longitudinal swing arms, and at least one bearing arm which is coupled to the bearing core. The bearing arm comprises a supporting section, which is coupled to the bearing core, and an elastic bending section with a connecting region, via which the bearing arm can be at least indirectly attached to the body of the vehicle. The bearing arm has a step portion arranged between the supporting section and the bending section, the step portion having a triangular or trapezoidal contour and being configured to be deflected in a bending direction which is predefined by the bending section. The bending direction and the rotational axes enclose an angle between them.

In accordance with another aspect of the present disclosure, a bearing arrangement for a torsion beam axle is provided. The bearing arrangement comprises a rotational axis, a bearing core, which can be connected to a longitudinal swing arm, and at least one bearing arm. The bearing arm is coupled to the bearing core and comprises a supporting section coupled to the bearing core and an elastic bending section with a connecting region. The bearing arm can be at least indirectly attached to a body of a vehicle via the connecting region. The bearing arm has a step portion arranged between the supporting section and the bending section, the step portion having a triangular or trapezoidal contour and being configured to be deflected in a bending direction, which is predefined by the bending section. The bending direction and the rotational axis enclose an angle between them.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

DESCRIPTION OF THE EMBODIMENTS

Figure 1:
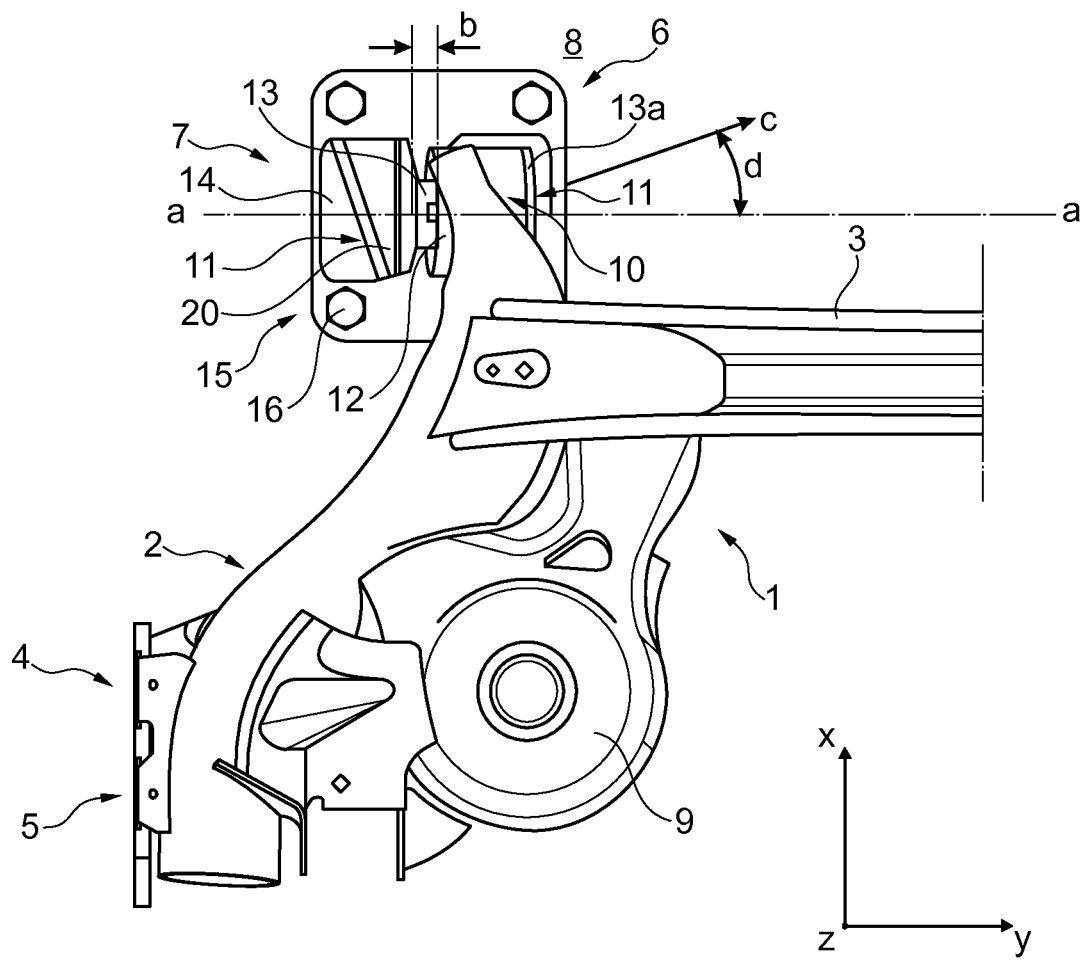
FIG. 1 is a view of an underside of a bearing arrangement which is provided for attachment to a vehicle and shows a detail of a twist beam axle according to the present teachings.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a torsion beam axle for a vehicle is disclosed. The torsion beam axle is suitable as a rear axle for a vehicle. The torsion beam axle, as disclosed herein, can be combined with a front wheel drive in a vehicle, in particular, in a motor vehicle.

The torsion beam axle comprises two longitudinal swing arms, which are spaced apart from one another and on each of which one wheel of the vehicle axle is rotatably arranged. When the torsion beam axle is installed in the vehicle, the longitudinal swing arms extend substantially parallel to a longitudinal direction of the vehicle. Furthermore, the longitudinal swing arms are connected to one another by way of a torsion profile, which extends between them. The connection of the two longitudinal swing arms via the torsion profile is a flexurally rigid configuration. The torsion profile itself serves as an anti-roll bar; it can be rotated within itself counter to a design-induced resistance. Suitable torsion profiles include a configuration as a hollow profile, with a U-shaped or T-shaped cross section for the torsion profile.

In addition, two bearing arrangements are provided for attaching the torsion beam axle to a body of a vehicle. The body of the vehicle can be, for example, a supporting vehicle frame or a subframe or a correspondingly configured region of a self-supporting vehicle body.

The bearing arrangements are spaced apart from one another and each of the individual bearing arrangements is connected to one of the longitudinal swing arms. In this arrangement, each of the bearing arrangements form one rotary bearing, around the rotational axis of which the respective longitudinal swing arm can be pivotably attached to the body of the vehicle. The rotational axes of the two bearing arrangements run at least parallel to one another. The two rotational axes of the bearing arrangements are aligned with one another, with the result that the torsion beam axle can be pivoted around a single rotational axis.

Each of the bearing arrangements have a bearing core which is connected to one of the longitudinal swing arms. In addition, at least one bearing arm per bearing arrangement is provided. The bearing core is coupled to the bearing arm. The longitudinal swing arms are each connected via a bearing core to at least one bearing arm of the corresponding bearing arrangement. Here, the arrangement of the bearing core serves for rotatability, with the result that the longitudinal swing arms can be pivoted with respect to the bearing arms.

According to one aspect of the present disclosure, the respective bearing arm is configured to be deflected in one direction. Here, the possible direction is not arbitrary, but rather predetermined. Hereinafter, the direction of the deflection will be generally called the "bending direction" in the following text.

In relation to the driving properties of a vehicle which is equipped in this way, lateral forces of different magnitude occur, in particular, when driving around bends. The lateral forces are predominantly transmitted via the wheel on the outside of the bend to the associated longitudinal swing arm and from there to the respective bearing arrangement. The deflection of the bearing arrangements and, in particular, the bearing arms in the bending direction depends on the respective magnitude of the lateral forces. In accordance with the present teachings, the respective bearing arm is configured here in such a way that the possible bending direction and the respective rotational axis of the bearing arrangement enclose an angle between them. In other words, the bearing arm cannot be deflected parallel to the rotational axis of the bearing arrangement, but rather is deflected at an angle with respect to the rotational axis.

At least some portions (or sections) of the bearing arm are elastic. In this way, the production outlay for the design is reduced to a minimum. To this end, the bearing arm comprises a supporting section and an elastic bending section. The bending section is configured to make the deflectability of the bearing arm possible by way of its elastic deformation. To this end, the bending section can have a corresponding elastic material selection. The elastic deformability of the bending section is due to its cross-sectional dimensions. For instance, at least the bending section can be formed from a flat material which has a correspondingly strong axis and a weak axis. This can be substantiated by the respectively different section moduluses. Here, the weak axis extends in the direction of a width which exceeds the thickness of the flat material. This design ensures that the bearing arm can be deformed elastically around the weak axis of its bending section.

The bending direction of the bearing arm is predefined by the design of its bending section. In principle, different embodiments of the bending section are conceivable, in order to adapt its section modulus in the bending direction to the required resistance. For instance, in addition to suitable cross-sectional dimensions, the bending section also can have apertures which are introduced in a targeted manner and contribute to the adaptation of the section modulus.

The supporting section is coupled to the bearing core, whereas the bending section has a sufficiently dimensioned connecting region. Via the connecting region, the bearing arm can be attached at least indirectly to the body of the vehicle. It is conceivable that the bending section is configured to be longer than the supporting section. This ensures that the elastic deformation of the bearing arm is concentrated or even completely reduced to its bending section.

The bearing arm has a step portion arranged between its supporting section and its bending section. The step portion can be, for example, an offset within the course of the bearing arm. Additionally or alternatively, the step portion can be formed by a change in cross section of the bearing arm. The step portion has a triangular or trapezoidal contour. This design achieves a situation where the flat supporting section and the flat bending section do not run in a common plane, but rather, in relation to the longitudinal direction of the bearing arm, are rotated counter to one another around the longitudinal direction or around an axis which is parallel to the longitudinal direction.

In relation to the arrangement of the torsion beam axle on a vehicle, the respective supporting section can run parallel to the longitudinal direction of the vehicle. As a result, the bearing core is coupled to the supporting section in such a way that its rotational axis forms a normal with respect to the supporting section. The bending section is rotated with respect to the supporting section, and the bending section is correspondingly inclined with respect to the longitudinal direction of the vehicle. As a result, the bending direction of the bearing arm also is inclined, such that the angle between the bending direction and the rotational direction is set. Since the bending direction is predefined by the course of the bending section, the bending direction is likewise inclined with respect to the rotational axis of the bearing arrangement.

In accordance with the present teachings, in the above described design the respective rotational axes of the two bearing arrangements are not inclined with respect to one another. As a result, the loads of the bearing cores are reduced considerably, since the bearing cores do not have to compensate for any movements which tilt them. As a consequence, during compression and rebound of the longitudinal swing arms, merely their respective rotational movements around the rotational axes and the static and dynamic transverse loads have to be absorbed by the bearing cores.

In particular, the novel configuration of the bearing arms results in an effective option for correcting the track of the wheels, in order to reduce the oversteering tendency. The deflection of the respective bearing arm, which occurs under the influence of lateral force, causes the longitudinal swing arm, which is coupled to the bearing arm and, therefore, the wheel which is arranged thereon, to be moved in the bending direction. Here, the bending direction is the resultant from a transverse movement and a longitudinal movement of the bearing arm in relation to the longitudinal direction of the vehicle. The bending direction is predefined in such a way that the longitudinal movement takes place in the driving direction of the vehicle while the vehicle is moving forward, whereas the transverse direction in question takes place toward the respectively opposite wheel. The side swing arm on the outside of the bend compresses when driving around bends, the associated wheel on the outside of the bend is moved counter to the restoring force of the bearing arm in the transverse direction under the vehicle and, at the same time, to the front. This results in slight rotation of the wheel on the outside of the bend, as a result of which the wheel track changes correspondingly.

The bearing arm may be designed to have, for example, a rotary joint, in order to make its deflection possible. To this end, however, the rotary joint itself has to be capable of applying corresponding restoring forces. Alternatively, the bearing arm can be loaded via other means with a spring force which counteracts its deflection.

In accordance with one exemplary embodiment of the present disclosure, the bearing arm, as described with respect to the above design options, is formed from flat material such as, for example, flat iron. The bearing arm is a bent part, with the result that the supporting section and bending section and the step portion which connects the supporting section and the bending section are formed in a unitary structure, and may be a single-piece constituent part made from one material. Additionally or alternatively, the step can be formed due to either the bending section or the supporting section having, for example, a triangular or trapezoidal cross section. This configuration achieves a situation where at least in each case one side face of the bending section runs in an inclined manner with respect to at least one side face of the supporting section, as described above. In order to obtain a design of the bending section which is as elastic as possible, the triangular or trapezoidal cross section should be limited to the supporting section. In contrast, the cross section of the bending section can be of rectangular configuration.

According to one aspect of the present disclosure, each of the bearing arrangements can have two bearing arms. Certain advantages relating to sufficient stability and exact guidance of the bearing core result from such a configuration. For example, the associated bearing core can be arranged between the two bearing arms, the bearing core being coupled to both bearing arms.

Building on this, in accordance with one aspect of the present disclosure, the deflection of the bearing arm begins at the respective bearing arrangement on the outside of the bend or is reduced only to the bearing arrangement. In contrast, limited displaceability of the longitudinal swing arms with respect to the respective bearing arms is envisaged. Here, the bearing arrangements are configured in such a way that loading of the respective wheel on the outside of the bend as a result of lateral forces brings about a direct introduction of load into one of the associated bearing arms and, as a consequence, can at least initiate the deflection thereof. Secondly, the movement which takes place in the transverse direction of the wheel on the outside of the bend, which movement is transmitted via the longitudinal swing arms and the torsion profile which connects the longitudinal swing arms to the respectively opposite bearing arrangement on the inside of the bend, can be compensated for by the envisaged displaceability. In this case, loading of a bearing arm of the bearing arrangement on the inside of the bend, which loading initiates a deflection, is not carried out.

In order to realize a design as described above, the bearing core can have an outer sleeve which is connected to one of the longitudinal swing arms. In addition, an inner sleeve can be arranged in the outer sleeve, the inner sleeve being coupled to the two bearing arms of the respective bearing arrangement. In order to reduce the transmission of vibrations and for the elastic design of the bearing arrangements, an elastic body can be arranged, at least in regions, between the inner sleeve and the outer sleeve. The elastic body can be formed, for example, from rubber and can be vulcanized onto the mutually facing surfaces of the inner and outer sleeves. The outer sleeve can be moved in the direction of the respective rotational axis. In order to achieve the above-described displaceability within the bearing arrangements, the respective outer sleeve is spaced apart from one of the two bearing arms per bearing arrangement.

In such a configuration, the outer sleeves of the two bearing arrangements are spaced apart from the bearing arms, which face away from one another. At least the respectively inner bearing arm of the respective bearing arrangement on the outside of the bend is loaded by lateral forces, while a displacement takes place primarily within the bearing arrangement on the inside of the bend.

In accordance with one aspect of the present disclosure, the displacement within the bearing arrangements may be achieved by the inner sleeve and outer sleeve being moved relative to one another. A movement of this type can take place, for example, via the elastic body which is fixedly connected to the sleeves. As a result, any creaking noises can be effectively prevented, since no relative movement takes place between the elastic body and the sleeves which are connected to it.

In an alternative exemplary embodiment, the elastic body can be connected to only one of the sleeves, with the result that the other sleeve can be moved relative to the elastic body. In a further design, the bearing arrangements also can have a bolt which runs through the inner sleeves and is coupled to the respective bearing arms. In this way, the bearing cores can be displaced on the bolt via their inner sleeves.

In accordance with one exemplary embodiment, the bearing cores have a collar which is fixedly connected to the inner sleeve. The collar can be arranged on the end side of the inner sleeve, the collar forming an end stop for the outer sleeve, which can be moved with respect to the inner sleeve. In this way, the bearing cores are configured to permit relative movement between the sleeves, which are arranged respectively one inside another, in only one direction.

According to another aspect of the present disclosure, the connecting region of the respective bearing arm can be formed by a flange of the bearing arm, the flange being angled away from the bending section. The flange is integrally connected to the bending section and is formed of the same material as the bending section. As a result, extremely economical production is made possible, by the respective bearing arms being manufactured as bent shapes.

In order to attach the torsion beam axle to the body of a vehicle, which attachment is as simple as possible and facilitates assembly, the connecting region of the bearing arm can be connected to a corresponding mounting plate. In this way, the entire torsion beam axle can be attached via one mounting plate of the bearing arrangements to the body of a vehicle. As a result, ease of any possible repairs also is facilitated in addition to ease of assembly.

In accordance with the present teachings, the novel torsion beam axle described herein contributes decisively to the improvement of the oversteering tendency of a vehicle in comparison to a vehicle equipped with a conventional torsion beam axle. The required track change is carried out by turning in of the wheel on the outside of the bend via the angular design with respect to one another of bending direction and rotational axis. Since the movement which is required for this purpose does not take place within the bearing cores, but rather is a result of the deflection of the bearing arms, the wear of the bearing cores is reduced considerably. Here, the deflection of the bearing arms has an extremely long service life, since the bearing arms can be manufactured from a stable material such as, for example, steel. Overall, this achieves a design of a torsion beam axle which is lightweight, space-saving, simple to produce and has a long service life, in particular in relation to the wear of the bearings.

The present disclosure also provides a novel bearing arrangement for a torsion beam axle, in particular for a torsion beam axle which is configured as described above.

In accordance with one aspect of the present disclosure, one of two longitudinal swing arms of the torsion beam axle, which are connected to one another via a torsion profile, can be pivotably attached to a body of a vehicle by the bearing arrangement. The bearing arrangement comprises a bearing core which can be connected to one of the longitudinal swing arms and at least one bearing arm which is coupled to the bearing core. According to the present teachings, the bearing arm is configured in such a way that it can be deflected in a bending direction. Here, the bending direction and the rotational axes enclose an angle between them.

In accordance with an exemplary embodiment of the present disclosure, the bearing arm comprises a supporting section, which is coupled to the bearing core, and an elastic bending section with a connecting region. In the installed state of the torsion beam axle, the bearing arm can be attached at least indirectly to the body of the associated vehicle via the connecting region. Here, the bearing arm has a step portion which is arranged between its supporting section and its bending section and has a triangular or trapezoidal contour. The step portion is configured so that the bearing arm can be deflected in a bending direction, which is predefined by the bending section. As a result of the arrangement of the triangular or trapezoidal step portion, the supporting section and the bending section, which are connected to one another via the step portion, are inclined with respect to one another in such a way that the bending direction and the rotational axes enclose an angle between them.

Turning now to the drawings, FIG. 1 shows a bottom view of a detail of an exemplary torsion beam axle 1. The present illustration is limited to one side of the torsion beam axle 1, which serves for coupling to a wheel (not shown) of a vehicle (not shown). As will be understood, the comments below also apply in a corresponding manner to the side of the torsion beam axle 1 which is not shown in FIG. 1. The vehicle has a longitudinal direction x which extends in the driving direction of the vehicle during forward driving. The vehicle has a transverse direction y which runs at a right angle to its longitudinal direction x, and a vertical direction Z which is upright at a right angle on the longitudinal direction x and transverse direction y and dips into the plane of the drawing in the present case.

The torsion beam axle 1 comprises two longitudinal swing arms 2, of which only one is shown in FIG. 1. The longitudinal swing arms 2 are connected to one another by a torsion profile 3. The longitudinal swing arm 2 which is shown has a course which is curved in a substantially S-shaped manner, the longitudinal swing arm 2 extending substantially in the longitudinal direction x of the vehicle. A wheel support 5, which serves to couple the wheel (not shown), is arranged on a first end section 4 of the longitudinal swing arm 2. The longitudinal swing arm 2 is connected to a bearing arrangement 7 on an end section 6 which lies opposite the first end section 4.

The bearing arrangement 7 has a rotational axis a, around which the longitudinal swing arm 2 can be pivoted. The extended illustration of the rotational axis a is intended to indicate that a further longitudinal swing arm 2 (not shown here) likewise has a bearing arrangement 7 with a rotational axis a, the rotational axes a being aligned with one another. The bearing arrangements 7 serve to attach the torsion beam axle 1 via its two longitudinal swing arms 2 to a body 8 of the vehicle (not shown). A spring support 9 extends between the longitudinal swing arm 2 and the torsion profile 3; the spring support 9 is connected to the longitudinal swing arm 2 and torsion profile 3. A helical spring (not shown) of the vehicle can be supported against the spring support 9.

The bearing arrangement 7 has a bearing core 10, which is connected to the second end section 6 of the longitudinal swing arm 2. Furthermore, the bearing arrangement 7 has two bearing arms 11, between which the bearing core 10 is arranged. In addition, the bearing core 10 is coupled to both bearing arms 11. To this end, the bearing core 10 has an outer sleeve 12, which is connected to the longitudinal swing arm 2, and within which an inner sleeve 13 is arranged. An elastic body (not shown) is arranged between the inner sleeve 13 and the outer sleeve 12. As shown in FIG. 1, the outer sleeve 12 is spaced apart from the one of the two bearing arms 11 which faces the wheel support 5. As a result of a spacing b which is maintained between the outer sleeve 12 and the bearing arm 11, the outer sleeve 12 can be moved relative to the bearing arrangement 7 in the direction of the rotational axes a. Here, the bearing core 10 is coupled to the two bearing arms 11 via the inner sleeve 13, which extends between the two bearing arms 11. The inner sleeve 13 has a collar 13a on which the outer sleeve 12 can be supported. The collar 13a is located at an end of inner sleeve 13 which lies opposite the spacing b from the bearing arm 11.

The bearing arms 11 each include one connecting region 14 in the form of a flange, the flange being angled away from the bearing arms 11. Here, the bearing arms 11 are connected via their connecting regions 14 to a mounting plate 15. By way of the mounting plate 15, the torsion beam axle 1 can be attached by connecting means 16 to the body 8 of the vehicle. The connecting means 16 may comprise any suitable connection structure such as, for example, bolts, screws, clamping structures, and their equivalents.

The bearing arms 11 are configured to be deflected in a bending direction c. Here, the bearing arms 11 are configured and/or arranged in such a way that the rotational axis a (running through the bearing core 10) of the bearing arrangement 7 and the bending direction c of the bearing arms 11 enclose an angle d between them. In the present case, the angle d is from 15° to 30°, and in one exemplary embodiment is from 20° to 25°.

The bending direction c is defined by the design of the bearing arms 11 and/or their arrangement in relation to the longitudinal direction x and the transverse direction y of the vehicle. This is illustrated in FIG. 2.

Figure 2:
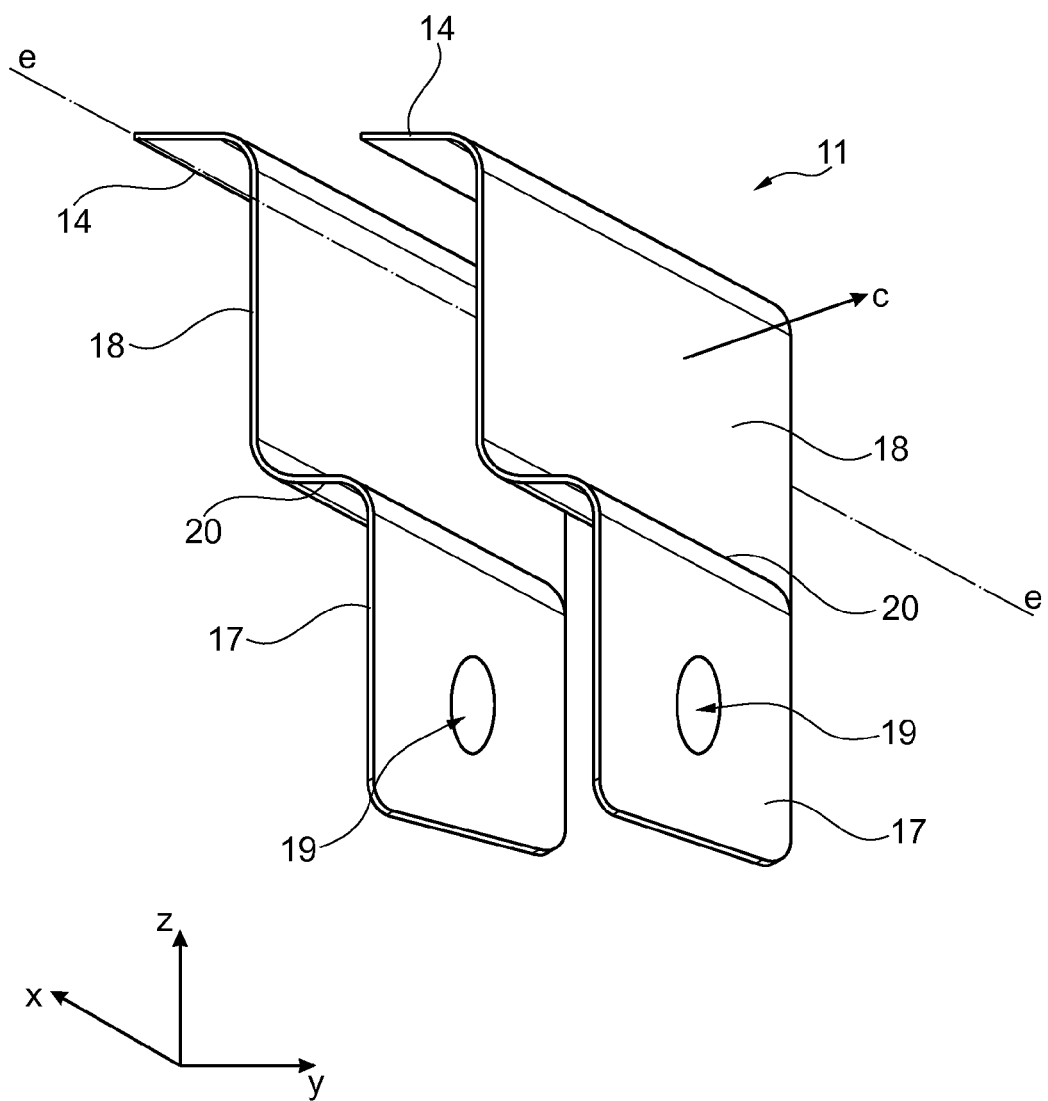
FIG. 2 is a perspective view of a detail of the bearing arrangement of FIG. 1.

FIG. 2 shows a perspective view of the two bearing arms 11 of the bearing arrangement 7 from FIG. 1. As shown, each respective bearing arm 11 comprises a supporting section 17 and an elastic bending section 18. The entire bearing arm 11 is formed from a flat material and is configured as a bent shape. The bearing arm 11 has a rectangular cross and a resultant weak axis e, with the result that the bending direction c of the bearing arm 11 is predefined by the course of the bending section 18. In other words, the bending direction c extends in the direction of a normal of the bending section 18. The supporting section 17 is coupled to the bearing core 10 shown in FIG. 1. To this end, the respective supporting section 17 has an opening 19 which is arranged through the supporting section 17. The opening 19 of the supporting section 17 of each bearing arm 11 being aligned with each other. The openings 19 serve to receive a bolt (not shown) or to receive the inner sleeve 13 from FIG. 1.

A step portion 20 in the form of an offset is arranged between the supporting section 17 and the bending section 18 of the respective bearing arm 11. It can be seen in an overall assessment of FIG. 1 that the step portion 20 has a triangular or trapezoidal contour. As a result, the supporting section 17 and the bending section 18 of the respective bearing arm 11 are inclined with respect to one another.

Further modifications and alternative embodiments will be apparent to those of ordinary skill in the art in view of the disclosure herein. For example, the systems may include additional components that were omitted from the diagrams and description for clarity of operation. This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A torsion beam axle for a vehicle, comprising:
two longitudinal swing arms connected by a torsion profile;

two bearing arrangements, each configured to attach a respective longitudinal swing arm to a body of the vehicle, each bearing arrangement having a rotational axis, the rotational axes run in parallel to or are aligned with one another, wherein each of the bearing arrangements has a bearing core, which is connected to one of the longitudinal swing arms, and at least one bearing arm which is coupled to the bearing core;

wherein the bearing arm comprises a supporting section, which is coupled to the bearing core, and an elastic bending section with a connecting region, via which the bearing arm can be at least indirectly attached to the body of the vehicle, wherein the bearing arm has a step portion arranged between the supporting section and the bending section, the step portion having a triangular or trapezoidal contour and being configured to be deflected in a bending direction that is predefined by the bending section, and wherein the bending direction and the rotational axes enclose an angle between them.

2. The torsion beam axle as claimed in claim 1, wherein each of the bearing arrangements has two bearing arms, the bearing core being arranged between the two bearing arms and being coupled to the two bearing arms.

3. The torsion beam axle as claimed in claim 2, wherein the bearing core has an outer sleeve, which is connected to one of the longitudinal swing arms, and an inner sleeve, which is arranged in the outer sleeve and is coupled to the two bearing arms, wherein an elastic body is arranged between the inner and outer sleeves and wherein the outer sleeve is movable relative to the inner sleeve in a direction of the rotational axes, wherein the inner sleeve is spaced apart from one of the two bearing arms.

4. The torsion beam axle as claimed in claim 1, wherein the connecting region of the bearing arm is formed by a flange of the bearing arm, the flange being disposed at an angle relative to the bending section.

5. The torsion beam axle as claimed in claim 1, wherein the connecting region of the bearing arm is connected to a mounting plate configured to connect the torsion beam axle to the vehicle.

6. The torsion beam axle as claimed in claim 1, wherein the bending section and the supporting section are rotated relative to one another about a longitudinal axis of the bearing arm.

7. The torsion beam axle as claimed in claim 1, wherein each of the bending section and the supporting section comprise flat surfaces, wherein the flat surfaces of the bending section and the supporting section are disposed at nonzero angles relative to one another.

8. The torsion beam axle as claimed in claim 7, wherein the flat surface of the bending section is disposed at a nonzero angle relative to the rotational axes of the bearing arrangements.

9. The torsion beam axle of claim 1, wherein the angle enclosed by the bending direction and the rotational axes is non-zero and less than ninety degrees) (90°).

10. The torsion beam axle of claim 9, wherein the angle enclosed by the bending direction and the rotational axes is between about fifteen degrees (15°) and about thirty degrees (30°).

11. The torsion beam axle of claim 1, wherein the supporting section of the bearing arm and the bending section of the bearing arm are oriented in a non-parallel relationship.

12. A bearing arrangement for a torsion beam axle, comprising:
a rotational axis;
a bearing core, which can be connected to a longitudinal swing arm; and
at least one bearing arm, which is coupled to the bearing core, wherein the bearing arm comprises a supporting section coupled to the bearing core and an elastic bending section with a connecting region, via which the bearing arm can be at least indirectly attached to a body of a vehicle, the bearing arm having a step portion arranged between the supporting section and the bending section, the step portion having a triangular or trapezoidal contour and being configured to be deflected in a bending direction, which is predefined by the bending section, the bending direction and the rotational axis enclosing an angle between them.

13. The bearing arrangement as claimed in claim 12, wherein each of the bending section and the supporting section comprise flat surfaces, wherein the flat surfaces of the bending section and the supporting section are disposed at angles relative to one another.

14. The bearing arrangement as claimed in claim 12, wherein the flat surface of the bending section is disposed at a nonzero angle relative to the rotational axis.

15. A torsion beam axle suspension, comprising:
a bearing arm, comprising:
a connecting section configured to connect to a vehicle body;
a supporting section;
a bearing affixed to the supporting section; and
a bending section configured to deflect under a load applied by a lateral acceleration of the vehicle, wherein the bending section deflects in a bending direction that forms an acute angle with respect to a rotational axis of the bearing.

16. The torsion beam axle suspension of claim 15, wherein the bending direction is predefined by the configuration of the bending section, and wherein deflection of the bending section in the bending direction changes a tracking direction of a wheel attached to the torsion beam axle suspension.

* * * * *